(12) United States Patent
Puri et al.

(10) Patent No.: US 11,767,797 B2
(45) Date of Patent: *Sep. 26, 2023

(54) SYSTEMS AND METHODS FOR CONTROLLING CYLINDER DEACTIVATION OPERATION IN ELECTRIFIED POWERTRAINS

(71) Applicant: Cummins Inc., Columbus, IN (US)

(72) Inventors: Anant Puri, Greenwood, IN (US); J. Steven Kolhouse, Columbus, IN (US); Apurva A. Chunodkar, Greenwood, IN (US)

(73) Assignee: CUMMINS INC., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/830,055

(22) Filed: Jun. 1, 2022

(65) Prior Publication Data
US 2022/0290622 A1    Sep. 15, 2022

Related U.S. Application Data

(63) Continuation of application No. 16/983,010, filed on Aug. 3, 2020, now Pat. No. 11,378,022.

(51) Int. Cl.
*F02D 17/02* (2006.01)
*B60K 6/24* (2007.10)
(Continued)

(52) U.S. Cl.
CPC ............... *F02D 17/02* (2013.01); *B60K 6/24* (2013.01); *B60K 6/26* (2013.01); *F02D 41/1498* (2013.01);
(Continued)

(58) Field of Classification Search
CPC .. F02D 17/02; F02D 41/1498; F02D 41/2406; F02D 2200/0802; F02D 41/064;
(Continued)

(56) References Cited

U.S. PATENT DOCUMENTS 6,687,603 B2   2/2004  Wakashiro
6,886,524 B2   5/2005  Hanada
(Continued)

FOREIGN PATENT DOCUMENTS

CN    101408135 A    4/2009
CN    105221273 A    1/2016
(Continued)

*Primary Examiner* — Joseph J Dallo
(74) *Attorney, Agent, or Firm* — Faegre Drinker Biddle & Reath LLP

(57) ABSTRACT

At least some embodiments of the present disclosure are directed to systems and methods for controlling a cylinder deactivation (CDA) operation for an electrified powertrain, the electrified powertrain comprising an engine and an additional power source, the engine having a plurality of cylinders. The method includes the step of operating the electrified powertrain in a CDA mode and deactivating one or more selected cylinders of the plurality of cylinders; receiving measurement data indicative of operating conditions of the electrified powertrain; analyzing the measurement data to determine whether a predetermined operating condition is met; and adjusting the CDA operation by adjusting the duration of the CDA operation or changing a number of deactivated cylinders.

20 Claims, 7 Drawing Sheets

(51) Int. Cl.
*B60K 6/26* (2007.10)
*F02D 41/14* (2006.01)
*F02D 41/24* (2006.01)

(52) U.S. Cl.
CPC ...... *F02D 41/2406* (2013.01); *B60Y 2200/92* (2013.01); *B60Y 2300/435* (2013.01); *F02D 2200/0802* (2013.01)

(58) Field of Classification Search
CPC ............ F02D 41/1401; F02D 41/1406; F02D 41/2422; F02D 2200/025; F02D 2200/1002; F02D 2250/18; F02D 2250/24; F02D 41/0087; F02D 29/02; F02D 2200/60; B60K 6/24; B60K 6/26; B60K 6/48; B60Y 2200/92; B60Y 2300/435; B60W 2030/206; B60W 2050/0008; B60W 2050/0026; B60W 2420/54; B60W 2510/068; B60W 2710/083; B60W 10/06; B60W 10/08; B60W 20/17; B60W 30/20
See application file for complete search history.

(56) References Cited

U.S. PATENT DOCUMENTS

| | | | |
|---|---|---|---|
| 6,886,649 B2 | 5/2005 | Wakashiro | |
| 6,934,610 B2 | 8/2005 | Wakashiro | |
| 7,785,230 B2 | 8/2010 | Gibson et al. | |
| 8,464,690 B2 | 6/2013 | Yuille | |
| 8,892,330 B2 | 11/2014 | Yuille | |
| 9,308,891 B2 | 4/2016 | Cudak et al. | |
| 9,771,883 B1 * | 9/2017 | Haskara | F02D 41/1406 |
| 10,214,219 B2 | 2/2019 | Richards et al. | |
| 10,401,853 B2 | 9/2019 | Miller et al. | |
| 10,464,564 B2 | 11/2019 | Miller et al. | |
| 10,486,704 B2 | 11/2019 | Miller et al. | |
| 10,518,764 B2 | 12/2019 | Cao et al. | |
| 10,968,879 B2 | 4/2021 | Pursifull et al. | |
| 11,378,022 B2 | 7/2022 | Puri et al. | |
| 2007/0215101 A1 | 9/2007 | Russell et al. | |
| 2009/0325764 A1 | 12/2009 | Surnilla et al. | |
| 2012/0271500 A1 | 10/2012 | Tsimhoni et al. | |
| 2013/0297191 A1 | 11/2013 | Gibson et al. | |
| 2015/0149023 A1 | 5/2015 | Attard et al. | |
| 2015/0377152 A1 | 12/2015 | Moren | |
| 2016/0003168 A1 | 1/2016 | Leone et al. | |
| 2016/0116293 A1 | 4/2016 | Grover et al. | |
| 2016/0328976 A1 | 11/2016 | Jo et al. | |
| 2017/0276074 A1 | 9/2017 | Haskara et al. | |
| 2018/0046184 A1 | 2/2018 | Subramanian et al. | |
| 2018/0194356 A1 | 7/2018 | Richards et al. | |
| 2018/0204049 A1 | 7/2018 | Hong | |
| 2019/0178180 A1 | 6/2019 | Pirjaberi | |
| 2022/0034267 A1 | 2/2022 | Puri et al. | |

FOREIGN PATENT DOCUMENTS

| | | |
|---|---|---|
| CN | 105275648 A | 1/2016 |
| WO | 2018204049 A1 | 11/2018 |

* cited by examiner

SYSTEMS AND METHODS FOR CONTROLLING CYLINDER DEACTIVATION OPERATION IN ELECTRIFIED POWERTRAINS

CROSS REFERENCE TO RELATED APPLICATIONS

This application claims priority U.S. patent application Ser. No. 16/983,010, filed Aug. 3, 2020, the disclosure of which is hereby expressly incorporated by reference in its entirety.

TECHNICAL FIELD

The present disclosure generally relates to controlling cylinder deactivation (CDA) operation for electrified powertrains.

BACKGROUND

In internal combustion engines (ICEs), one or more fuel pumps deliver fuel to a common rail. Fuel is delivered by fuel injectors from the rail to cylinders of the engine for combustion to power operation of the system driven by the engine. Recently, there has been an increased demand for vehicles with electrified powertrains to improve fuel economy and reduce emissions, e.g., vehicles with multiple forms of motive power. Some electrified powertrains include an engine (e.g., internal combustion engine), motor/generator(s) and battery(s). The engine can produce drive torque that is transferred to the hybrid drivetrain and used to charge the battery(s). When the battery(s) is(are) sufficiently charged, the electrified powertrain can operate without using the engine. Cylinder deactivation (CDA) is another way to improve fuel economy and reduce emissions by reducing the engine's displacement and shutting off selective cylinders when certain conditions are met.

SUMMARY

Many vehicles can operate in cylinder deactivation (CDA) mode. CDA has known noise, vibration, and harshness (NVH) issues. At least some embodiments of the present disclosure are directed to systems and methods of integrating CDA with electrification to reduce NVH issues. In some embodiments, the motor/generator of the electrified powertrain can be controlled to execute torque modulation to carry noise and vibration cancellation in the region where non-desirable CDA dynamics exist. In some embodiments, the motor/generator (MG) is controlled to produce assistive or counteracting torque to make the engine torque profile smooth from engine cycle to engine cycle, when the engine is operated in CDA mode. In some cases, the system can improve driver comfort and acceptance to the CDA mode. In some cases, the system can execute more aggressive CDA modes (e.g., a larger number of cylinders could be fuel cut) to gain better fuel economy after NVH is addressed.

As recited in examples, Example 1 is a method of controlling a cylinder deactivation (CDA) operation for an electrified powertrain, the electrified powertrain comprising an engine and an additional power source, the engine having a plurality of cylinders. The method includes the step of: operating, by a controller comprising one or more processors, the electrified powertrain in a CDA mode and deactivating one or more selected cylinders of the plurality of cylinders; receiving, by the controller, measurement data indicative of operating conditions of the electrified powertrain; analyzing, by the controller, the measurement data to determine whether a predetermined operating condition is met: and in response to the predetermined operating condition is not met, adjusting, by the controller, the CDA operation by at least one of adjusting the duration of the CDA operation and changing a number of deactivated cylinders.

Example 2 is the method of Example 1, wherein the predetermined operating condition comprises at least one of a noise, vibration and harshness (NVH) criterion, an emission criterion, a transient performance criterion, and a drivability index criterion.

Example 3 is the method of Example 1 or Example 2, wherein the CDA operation is adjusted based at least partially on a look-up table on CDA modes and motor/generator torques.

Example 4 is the method of any one of Examples 1-3, wherein the measurement data comprises vehicle sensor data, wherein the CDA operation is adjusted based at least partially on the vehicle sensor data, and wherein the vehicle sensor data comprises data indicative of at least one of noise levels, vibration levels and harshness levels.

Example 5 is the method of any one of Examples 1-4, wherein the measurement data comprises vehicle sensor data, wherein the CDA operation is adjusted based at least partially on the vehicle sensor data, and wherein the vehicle sensor data comprises data indicative of at least one of exhaust gas temperatures and catalyst temperatures.

Example 6 is the method of any one of Examples 1-5, wherein the CDA operation is adjusted based at least partially on a drivability index.

Example 7 is the method of Example 6, wherein the drivability index is determined based at least partially on at least one of noise measurements, vibration measurements and harshness measurements.

Example 8 is the method of any one of Examples 1-7, wherein the CDA operation is adjusted based at least partially on a cost function applied to emission data.

Example 9 is the method of any one of Examples 1-8, wherein the CDA operation is adjusted based at least partially on a cost function applied to performance data.

Example 10 is the method of any one of Examples 1-9, wherein the CDA operation is adjusted based at least partially on a transient performance of the electrified powertrain.

Example 11 is a system of controlling a cylinder deactivation (CDA) operation for an electrified powertrain, the electrified powertrain comprising an engine and an additional power source, the engine having a plurality of cylinder. The system includes one or more memories having instructions: and one or more processors configured to execute the instructions to perform operations. The operations comprise: operating the electrified powertrain in a CDA mode and deactivating one or more selected cylinders of the plurality of cylinders; receiving measurement data indicative of operating conditions of the electrified powertrain; analyzing the measurement data to determine whether a predetermined operating condition is met; and in response to the predetermined operating condition is not met, adjusting the CDA operation by at least one of adjusting the duration of the CDA operation and changing a number of deactivated cylinders.

Example 12 is the system of Example 11, wherein the predetermined operating condition comprises at least one of a noise, vibration and harshness (NVH) criterion, an emission criterion, a transient performance criterion, and a drivability index criterion.

Example 13 is the system of Example 11 or 12, wherein the CDA operation is adjusted based at least partially on a look-up table on CDA modes and motor/generator torques.

Example 14 is the system of any one of Examples 11-13, wherein the measurement data comprises vehicle sensor data, wherein the CDA operation is adjusted based at least partially on the vehicle sensor data, and wherein the vehicle sensor data comprises data indicative of at least one of noise levels, vibration levels and harshness levels.

Example 15 is the system of any one of Examples 11-14, wherein the measurement data comprises vehicle sensor data, wherein the CDA operation is adjusted based at least partially on the vehicle sensor data, and wherein the vehicle sensor data comprises data indicative of at least one of exhaust gas temperatures and catalyst temperatures.

Example 16 is the system of any one of Examples 11-15, wherein the CDA operation is adjusted based at least partially on a drivability index.

Example 17 is the system of Example 16, wherein the drivability index is determined based at least partially on at least one of noise measurements, vibration measurements and harshness measurements.

Example 18 is the system of any one of Examples 11-17, wherein the CDA operation is adjusted based at least partially on a cost function applied to emission data.

Example 19 is the system of any one of Examples 11-18, wherein the CDA operation is adjusted based at least partially on a cost function applied to performance data.

Example 20 is the system of any one of Examples 11-19, wherein the CDA operation is adjusted based at least partially on a transient performance of the electrified powertrain.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

DETAILED DESCRIPTION

Unless otherwise indicated, all numbers expressing feature sizes, amounts, and physical properties used in the specification and claims are to be understood as being modified in all instances by the term "about" Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise.

As used herein, when an element, component, device or layer is described as being "on" "connected to," "coupled to" or "in contact with" another element, component, device or layer, it can be directly on, directly connected to, directly coupled with, in direct contact with, or intervening elements, components, devices or layers may be on, connected, coupled or in contact with the particular element, component or layer, for example. When an element, component, device or layer for example is referred to as being "directly on," "directly connected to," "directly coupled to," or "directly in contact with" another element, component, device or layer, there are no intervening elements, components, devices or layers for example.

Although illustrative methods may be represented by one or more drawings (e.g., flow diagrams, communication flows, etc.), the drawings should not be interpreted as implying any requirement of, or particular order among or between, various steps disclosed herein. However, certain some embodiments may require certain steps and/or certain orders between certain steps, as may be explicitly described herein and/or as may be understood from the nature of the steps themselves (e.g., the performance of some steps may depend on the outcome of a previous step). Additionally, a "set," "subset," "series" or "group" of items (e.g., inputs, algorithms, data values, etc.) may include one or more items, and, similarly, a subset or subgroup of items may include one or more items. A "plurality" means more than one.

As used herein, the term "based on" is not meant to be restrictive, but rather indicates that a determination, identification, prediction, calculation, and/or the like, is performed by using, at least, the term following "based on" as an input. For example, predicting an outcome based on a particular piece of information may additionally, or alternatively, base the same determination on another piece of information.

Figure 1A:
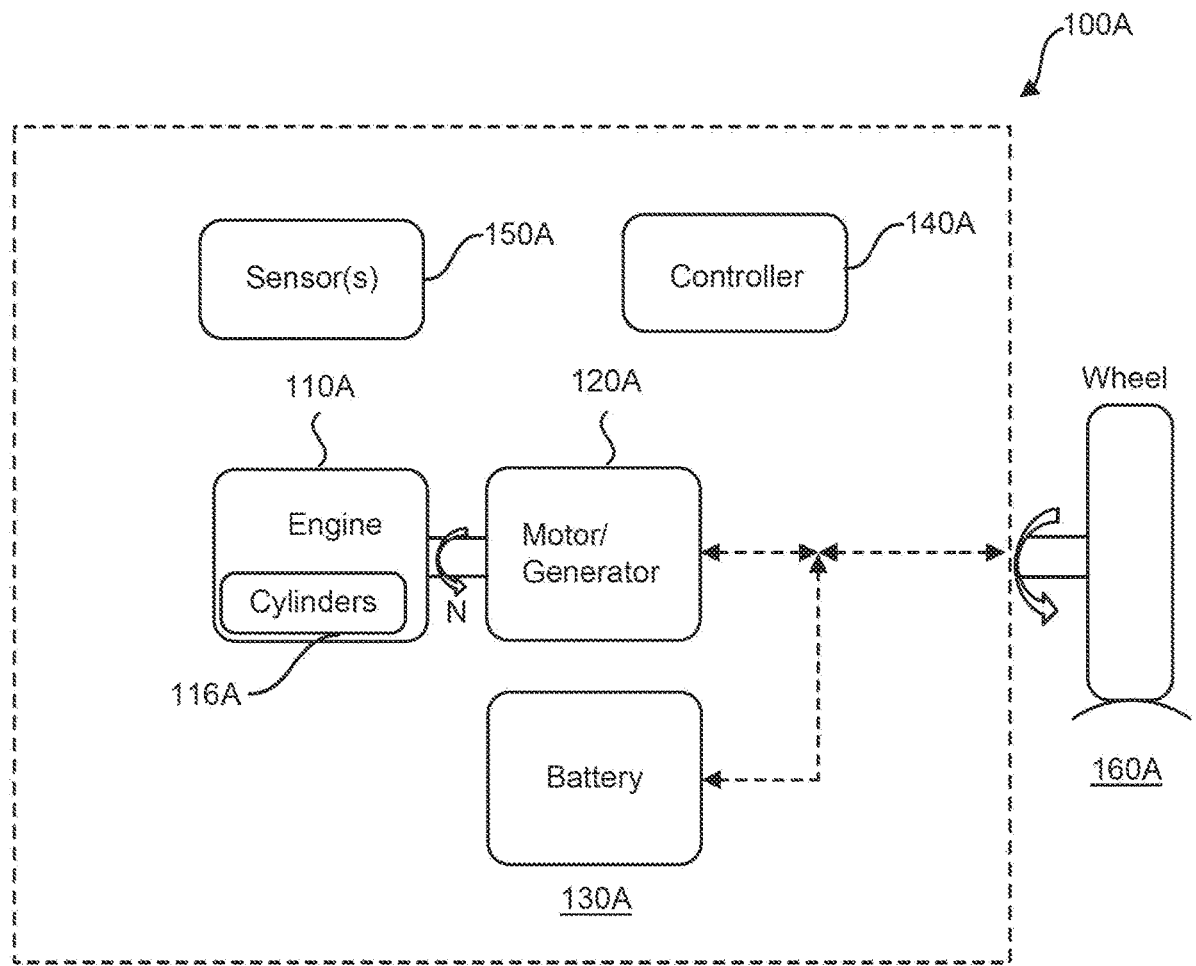
FIG. 1A depicts an illustrative diagram of an electrified powertrain, in accordance with certain embodiments of the subject matter of the disclosure.

FIG. 1A depicts an illustrative diagram of an electrified powertrain system 100A, in accordance with certain embodiments of the subject matter of the disclosure. The electrified powertrain system 100A includes an engine 110A, a motor/generator 120A, a battery or other additional power source 130A, a controller 140A and one or more sensor 150A. In some designs, the motor/generator 120A is configured to provide traction power to wheels 160A of a vehicle. The engine 110A includes a plurality of cylinders 116A.

In some cases, the controller 140A is configured to receive a plurality of electrified powertrain operational parameters such as, for example, current speed, current power level of the engine, the battery SOC, and/or the like. In some cases, the controller 140A is configured to receive a plurality of vehicle sensor data collected from the sensor(s) 150A such as, for example, noise data, vibration data, harshness data, exhaust gas temperature, catalyst temperature, and/or the like. In some embodiments, the sensor(s) 150A can detect and measure various conditions when the electrified powertrain is in operation. In some embodiments, the sensors 150A include an exhaust gas temperature sensor. In some embodiments, the sensors 150A include a catalyst temperature sensor. In some embodiments, the sensors 150A include sensors for measuring noise, vibration, and harshness (NVH).

In some embodiments, the controller 140A is configured to control the operation of the electrified powertrain such as, for example, controlling the CDA operation, deactivating selective cylinder(s), controlling torques, and/or the like. In some embodiments, the electrified powertrain system 100A is configured to receive a vehicle power request and distribute power from a combination of the engine 110A and the battery 130A in response to the power request. In some cases, when the engine 110A produces more power than requested, the extra power is used to charge the battery 130A.

In some embodiments, the controller 140A is configured to control the CDA operation in response to the received operation data and/or sensor data. In one embodiment, the controller 140A is configured to extend or vary the CDA operation to reduce NVH issues, for example. In response to sensor data indicative of NVH measurements. In one embodiment, the controller 140A is configured to extend or vary the CDA operation in response to emission measurements. In one embodiment, the controller 140A is configured to extend or vary the CDA operation by determining a torque adjustment and sending a corresponding torque request to the electrified powertrain. In one example, the controller 140A is configured to extend or vary the CDA operation based upon a drivability index. As used herein, a drivability index refers to a measure of fuel's performance and/or driver comforts across a number of operating conditions, which includes operating conditions in cold start and warmed up operations. In one embodiment, the drivability index includes an indication of driver comforts, where a higher drivability index indicates a higher driver comfort, level and a lower drivability index indicates a lower driver comfort level. In some embodiments, the drivability index includes one or more measures of NVH indicative of at least one of noise levels, vibration levels, and harshness levels. In some embodiments, a higher NVH measure indicates a higher level (e.g., an aggregated level or an average level) of at least one of noise levels, vibration levels, and harshness levels and a lower NVH measure indicates a lower level of at least one of noise levels, vibration levels, and harshness levels. In such embodiments, a higher drivability index includes a lower NVH measure and a lower drivability index includes a higher NVH measure.

In another example, the controller 140A is configured to extend or vary the CDA operation based upon a cost function applied to emission variables and/or performance variables. As used herein, a cost function refers to a mathematical empirical function of parameters of interest. The parameters of interest can be, for example, emission variables, fuel consumptions, exhaust gas and catalyst temperature requirements, performance requirements (e.g., vehicle acceleration, vehicle speed), and/or the like. One example of a cost function is applying arithmetic operations(s) to the parameters of interest. In one example, the cost function is a weighted summation of the parameters of interest. The emission variables can include, for example, the exhaust gas temperature, the catalyst temperature, nitrogen oxides emission, nitrogen oxide emission, nitrogen dioxide emission, carbon dioxide emission, carbon oxide emission, particulate matter (PM) emission, smoke and/or the like. The performance variables can include, for example, the fuel efficiency, torque performance, transient performance, and/or the like. In some cases, the controller 140A is configured to extend or vary the CDA operation based upon the transient performance. As used herein, transient performance refers to how fast a powertrain can supply a certain torque. In some cases, the controller 140A is configured to extend or vary the CDA operation based upon one or more criteria and parameters as described herein.

Figure 1B:
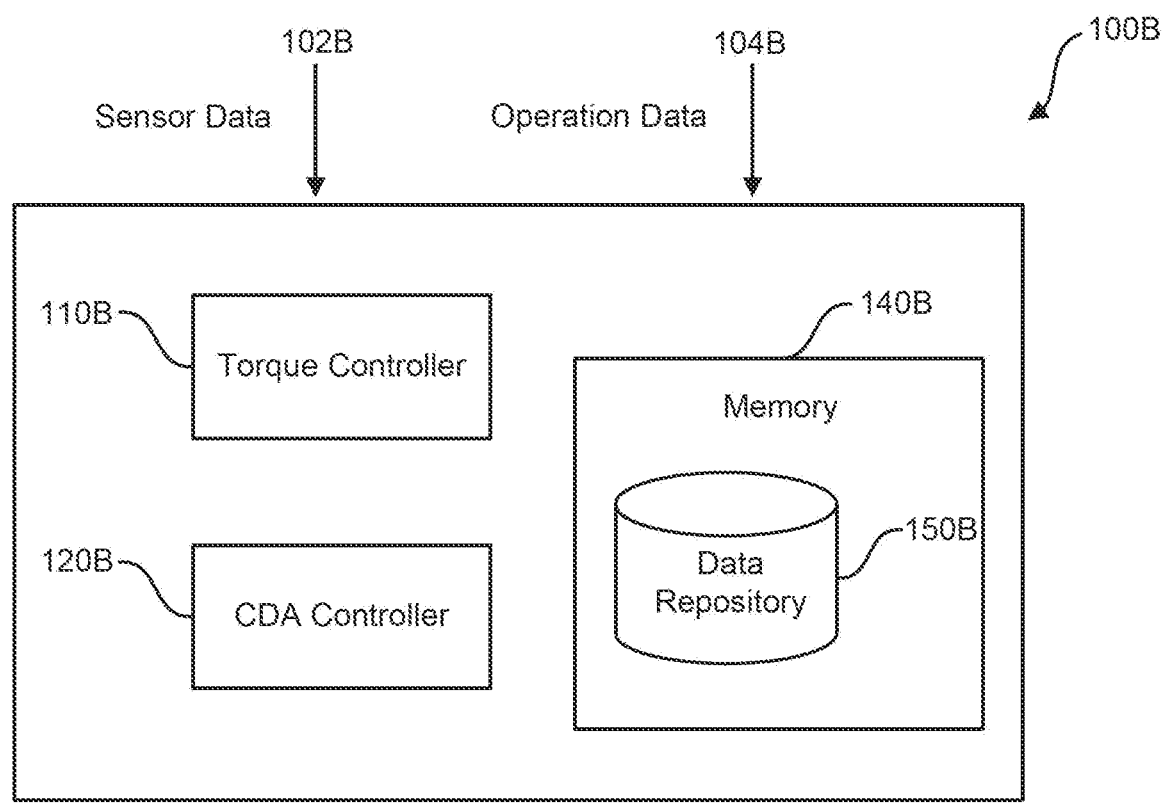
FIG. 1B depicts an illustrative design diagram for an electrified powertrain controller, in accordance with certain embodiments of the subject matter of the disclosure.

FIG. 1B depicts an illustrative design diagram for an electrified powertrain controller 100B, in accordance with embodiments of the subject matter of the disclosure. The controller 100B is configured to implement any embodiments of processes described in the present disclosure herein. In this example, the electrified powertrain controller 100B includes a torque controller 110B, a CDA controller 120B and a memory 140B. In some embodiments, the electrified powertrain controller 100B is configured to receive sensor data 102B and/or operation data 104B. The sensor data refers to vehicle sensor data, such as sensor data indicative of noise levels, vibration levels, harshness levels, exhaust gas temperatures, catalyst temperatures, and/or the like. The operation data refers to data indicative of vehicle operating conditions associated with the electrified powertrain such as, for example, speed, torque, power level of the engine, the battery state-of-charge (SOC), and/or the like. In some cases, the operation data is received from other systems associated with the electrified powertrain. In some cases, the sensor data 102B and the operation data 104B are collectively referred to as measurement data. In some cases, the memory 140B includes a data repository 150B, which can store the sensor data 102B, the operation data 104B, the torque adjustment data, the CDA operation data, the CDA mode v. torque look-up table, and/or the like.

In some embodiments, the torque controller 110B is configured to determine torque adjustments during the CDA operation based upon, for example, the sensor data 102B, operation data 104B, and/or the output from the CDA controller 120B, and send the torque adjustment requests. In some cases, the torque controller 110B is integrated with (i.e., as a software/hardware module) the controller 100B, In some cases, the torque controller 110B is external to the controller 100B and coupled to the controller 100B.

In some embodiments, the CDA controller 120B is configured to control the CDA operation, for example, by adjusting torque of the electrified powertrain via the torque controller 110B. In one embodiment, the CDA controller 120B is configured to control the CDA operation based upon the transient performance of the electrified powertrain. In one embodiment, the CDA controller 120B is configured to control the CDA operation based upon the received sensor data 102B and/or operation data 104B. In some designs, the CDA controller 120B is configured to extend the CDA operation to reduce emissions.

In some designs, the CDA controller 120B is configured to extend or vary the CDA operation by evaluating whether a predetermined operating condition is met, such that the CDA controller 120B is configured to extend the CDA operation or change the CDA operation to a move aggressive CDA mode if the predetermined operating condition is not met; and the CDA controller 120B is further configured to deactivate the CDA operation or change the CDA operation to a less aggressive CDA mode if the predetermined operating condition is met. In some embodiments, the predetermined operation condition includes at least one of NVH criteria, emission criteria, transient performance criteria, drivability index criteria, and/or the like. In some cases, the CDA controller 120B is integrated with (i.e., as a software/hardware module) the controller 100B. In some cases, the CDA controller 120B is external to the controller 100B and coupled to the controller 100B.

In some embodiments, the CDA controller 120B is configured to extend or vary the CDA operation based at least partially on vehicle sensor data. In some cases, the vehicle sensor data includes data indicative of at least one of noise levels, vibration levels and harshness levels. In some embodiments, the CDA controller 120B is configured to extend or vary the CDA operation based at least partially on sensor data indicative of at least one of exhaust gas temperatures and catalyst temperatures. For example, if the catalyst temperature is above 250° C., the CDA controller 120B may disable CDA operation or control the CDA operation to operate in a less aggressive CDA mode (e.g., deactivate less cylinders). As another example, if the catalyst temperature is lower than 250° C., the CDA controller 120B may extend, the CDA operation and/or control the CDA operation to operate in a more aggressive CDA mode (e.g., deactivate more cylinders and/or extend the deactivation).

In some embodiments, the CDA controller 120B is configured to extend or vary the CDA operation based at least partially on a drivability index. The drivability index is determined based at least partially on data collected from vehicle sensor(s). In one embodiment, NVH can be a part of the drivability index. In one embodiment, if the drivability index is higher than a predetermined drivability threshold, the CDA controller 120B may extend the CDA operation and/or control the CDA operation to operate in a more aggressive CDA mode. In some embodiments, if the drivability index is lower than a predetermined drivability threshold, the CDA controller 120B may disable the CDA operation or control the CDA operation to operate in a less aggressive CDA mode. In some cases, if the vibration measurement, noise measurement, and/or harshness measurement is lower than a predetermined threshold, the CDA controller 120B may extend the CDA operation and/or control the CDA operation to operate in a more aggressive CDA mode. In some cases, if the vibration measurement, noise measurement, and/or harshness measurement is greater than a predetermined threshold, the CDA controller 120B may disable the CDA operation or control the CDA operation to operate in a less aggressive CDA mode.

In some embodiments, the CDA controller 120B is configured to extend or vary the CDA operation based at least partially on a function of emission data and/or performance data. In one embodiment, the CDA controller 120B is configured to extend or vary the CDA operation using a table-based approach. In some cases, the table is a table of CDA modes v. motor/generator torques. In one example, the CDA modes in the table includes aggressive CDA mode, moderate CDA mode, and mild CDA mode. In some embodiments, the CDA controller 120B is configured to extend or vary the CDA operation based at least partially on a cost function applied to emission data and/or performance data. In one embodiment, if a cost function of emission data as variable is high (e.g., 1 or close to 1), the CDA controller 120B may engage CDA operation (e.g., extend the CDA operation and/or operate in a more aggressive CDA mode) to help reduce emissions. In one embodiment, if a cost function of emission data is low (e.g., 0.2 or lower than 0.2), the CDA controller 120B may disable the CDA operation or operate in a less aggressive CDA mode.

In some embodiments, a computing device (e.g., the electrified powertrain controller 100B, the torque controller 110B, the CDA controller 120B) includes a bus that, directly and/or indirectly, couples the following devices: a processor, a memory, an input/output (I/O) port, an I/O component, and a power supply. Any number of additional components, different components, and/or combinations of components may also be included in the computing device. The bus represents what may be one or more busses (such as, for example, an address bus, data bus, or combination thereof). Similarly, in some embodiments, the computing device may include a number of processors, a number of memory components, a number of I/O ports, a number of I/O components, and/or a number of power supplies. Additionally, any number of the components (e.g., the torque controller 110B, the CDA controller 120B) of the electrified powertrain controller 100B, or combinations thereof, may be distributed and/or duplicated across a number of computing devices.

In some embodiments, the memory 140B includes computer-readable media in the form of volatile and/or nonvolatile memory, transitory and/or non-transitory storage media and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; and/or any other medium that can be used to store information and can be accessed by a computing device such as, for example, quantum state memory, and/or the like. In some embodiments, the memory 140B stores computer-executable instructions for causing a processor (e.g., the controller 100B, the torque controller 110B, the CDA controller 120B) to implement aspects of embodiments of system components discussed herein and/or to perform aspects of embodiments of methods and procedures discussed herein.

Computer-executable instructions may include, for example, computer code, machine-useable instructions, and the like such as, for example, program components capable of being executed by one or more processors associated with a computing device. Program components may be programmed using any number of different programming environments, including various languages, development kits, frameworks, and/or the like. Some or all of the functionality contemplated herein may also, or alternatively, be implemented in hardware and/or firmware.

The data repository 150B may be implemented using any one of the configurations described below. A data repository may include random access memories, flat files, XML files, and/or one or more database management systems (DBMS) executing on one or more database servers or a data center. A database management system may be a relational (RDBMS), hierarchical (HDBMS), multidimensional (MDBMS), object oriented (ODBMS or OODBMS) or object relational (ORDBMS) database management system, and the like. The data repository may be, for example, a single relational database. In some cases, the data repository may include a plurality of databases that can exchange and aggregate data by data integration process or software application. In an exemplary embodiment, at least part of the data repository 150B may be hosted in a cloud data center. In some cases, a data repository may be hosted on a single computer, a server, a storage device, a cloud server, or the like. In some other cases, a data repository may be hosted on a series of networked computers, servers, or devices. In some cases, a data repository may be hosted on tiers of data storage devices including local, regional, and central.

Various components of the electrified powertrain controller 100B can communicate via or be coupled to via a communication interface, for example, a wired or wireless interface. The communication interface includes, but is not limited to, any wired or wireless short-range and long-range communication interfaces. The wired interface can use cables, wires, and/or the like. The short-range communication interfaces may be, for example, local area network (LAN), interfaces conforming known communications standard, such as Bluetooth® standard, IEEE 802 standards (e.g., IEEE 802.11), a ZigBee® or similar specification, such as those based on the IEEE 802.15.4 standard, or other public or proprietary wireless protocol. The long-range communication interfaces may be, for example, wide area network (WAN), cellular network interfaces, satellite communication interfaces, etc. The communication interface may be either within a private computer network, such as intranet, or on a public computer network, such as the internet.

Figure 2A:
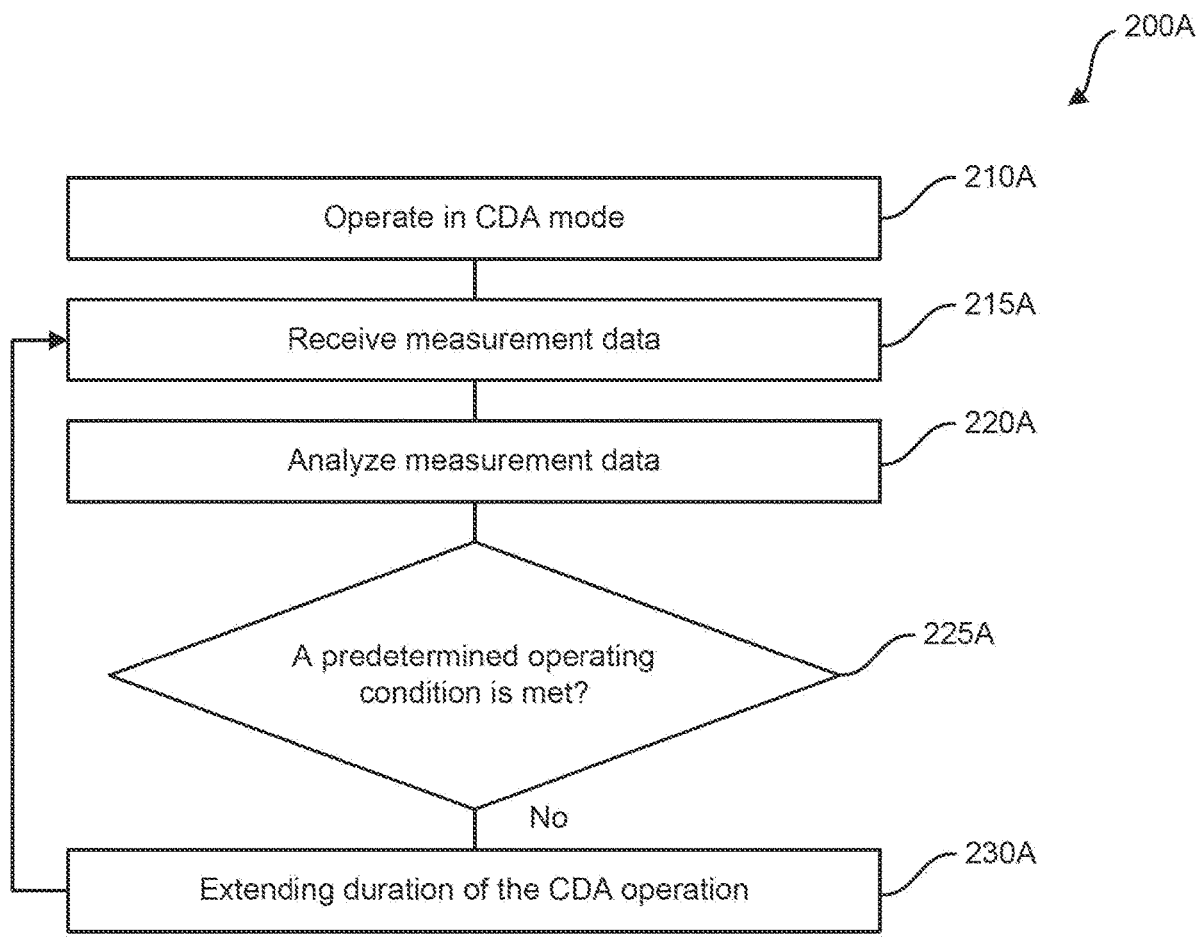
FIG. 2A is an example flow diagram depicting an illustrative method of controlling a CDA operation of an electrified powertrain, in accordance with certain embodiments of the present disclosure.

FIG. 2A is an example flow diagram depicting an illustrative method 200A of controlling a CDA operation of an electrified powertrain, in accordance with embodiments of the present disclosure. Aspects of embodiments of the method 200A may be performed, for example, by a controller for an electrified powertrain (e.g., the controller 140A in FIG. 1A, the controller 100B or the CDA controller 120B in FIG. 1B). One or more steps of method 200A are optional and/or can be modified by one or more steps of other embodiments described herein. Additionally, one or more steps of other embodiments described herein may be added to the method 200A. The electrified powertrain comprising an engine having a plurality of cylinders and an additional power source (e.g., the battery 130A in FIG. 1A). First, the electrified powertrain controller operates the electrified powertrain in the CDA mode (210A) and deactivates one or more selected cylinders of the plurality of cylinders.

The controller is configured to receive measurement data (215A) indicative of operating conditions of the electrified powertrain. The measurement data includes, for example, sensor data collected by a plurality of sensors and operation data collected from other systems, where the sensor data and the operation data are associated with the operating conditions of the electrified powertrain. In some cases, the sensor data comprises data collected by a plurality of sensors. The plurality of sensors include, for example, temperature sensor, pressure sensor, oxygen sensor, vibration sensor, acoustic transducer, engine speed sensor, crankshaft sensor, current/voltage sensor, and/or the like. As an example, the sensor data comprises data indicative of noise levels, vibration levels, harshness levels, exhaust gas temperatures, catalyst temperatures, and/or the like. In some cases, the sensor data comprises data indicative of vehicle emission conditions.

In some embodiments, the controller analyzes the measurement data (220A) to determine whether a predetermined operating condition is met (225A). In some cases, the predetermined operating condition can be a criteria associated with an emission parameter. In some cases, the predetermined operating condition can be a criteria associated with a torque profile. In some cases, the predetermined operating condition can be a criteria associated with an NVH performance. In some cases, the predetermined operating condition can be a criteria associated with an exhaust gas temperature. In some cases, the predetermined operating condition can be a criteria associated with catalyst temperature. In some cases, the predetermined operating condition can include one or more operating condition criteria described herein.

Referring back to Figure in response to the predetermined operating condition is not met, the controller can extend a duration of the CDA operation (230A), for example, by adjusting torques of the electrified powertrain. In some cases, a torque profile can be used. In some cases, extending CDA operation requires motor/generator torque contribution to engine torque when CDA mode is enabled. In some cases, motor/generator torque determination can be done by requesting motor/generator to provide torque that is not being provided by CDA mode engine. For example, under high transient events, motor/generator torque is requested since the CDA enabled engine is unable to provide full torque/power that the vehicle is demanding. For example, the requested motor/generator torque can be determined using equation (1) below:

$$\text{MG\_Torque} = \text{Demanded\_Torque} - \text{Engine\_Torque} \qquad (1),$$

where MG_Torque is the requested motor/generator torque, Demanded_Torque is the torque demanded during the vehicle operation, Engine_Torque is the torque supplied by the engine at the engine speed.

Figure 3:
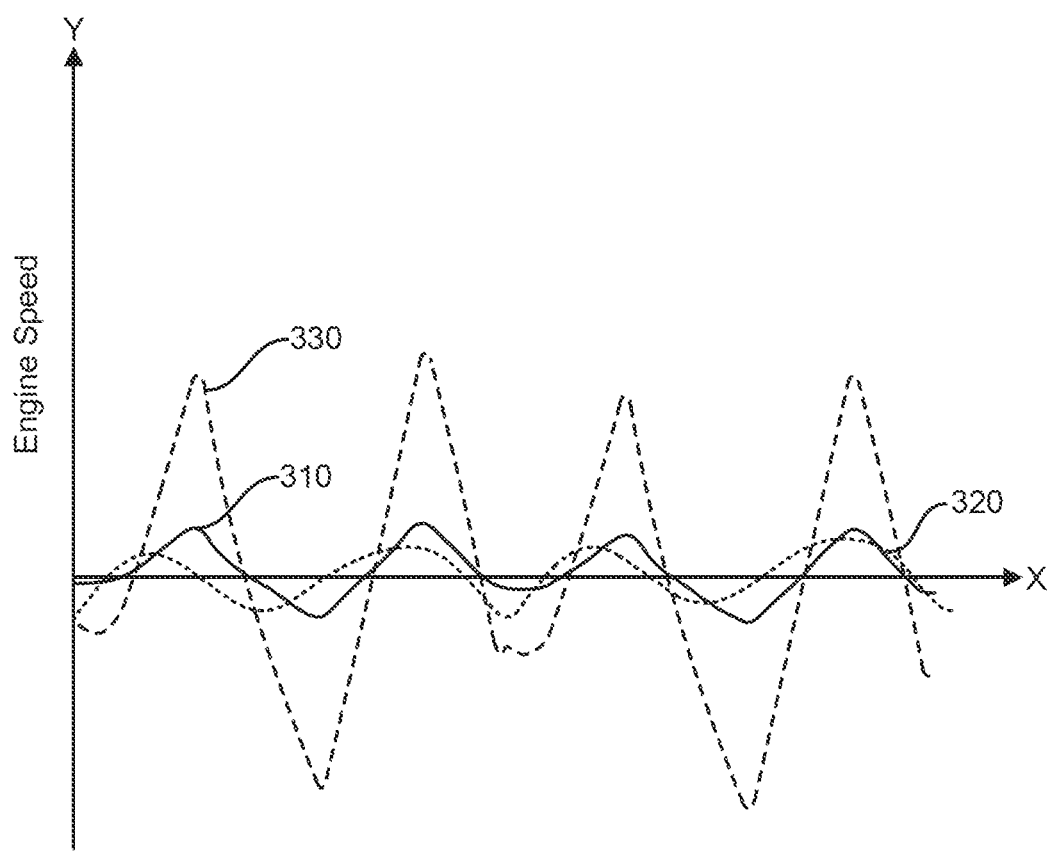
FIG. 3 is an illustrative example of the comparison of engine speeds in various operation mode.

FIG. 3 is an illustrative example of the comparison of engine speeds in various powertrain operation mode. The waveform 310 is an illustrative example of changes of engine speeds in an operation mode of CDA with torque assist, in accordance with certain embodiments of the present disclosure. The waveform 320 is an illustrative example of changes of engine speeds in conventional operation without CDA mode. The waveform 330 is an illustrative example of changes of engine speeds in conventional CDA mode. As illustrated, the engine speed profile in waveform 310 that is in CDA with torque assist mode is a smoother waveform than the waveform 330 that is in conventional CDA mode, where the CDA with torque assist improves the performance of conventional CDA. Further, the engine speed profile in waveform 310 that is in CDA with torque assist mode is a similar waveform as the waveform 320 that represents the engine speed profile of the conventional operation without CDA mode.

Figure 4:
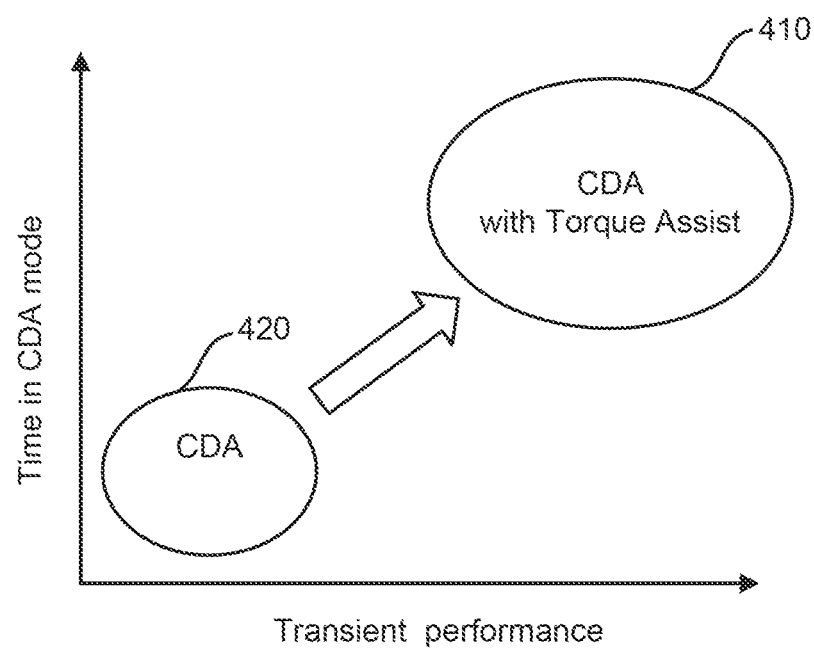
FIG. 4 is an illustrative example of transient performance.

FIG. 4 is an illustrative example of transient performance. The transient performance of electrified powertrains in CDA with torque assist mode, in accordance with certain embodiments of the present disclosure, is in the range of 410. The transient performance of engines in conventional CDA mode is in the range of 420. As shown, the CDA with torque assist mode improves the transient performance of CDA operation.

Figure 5A:
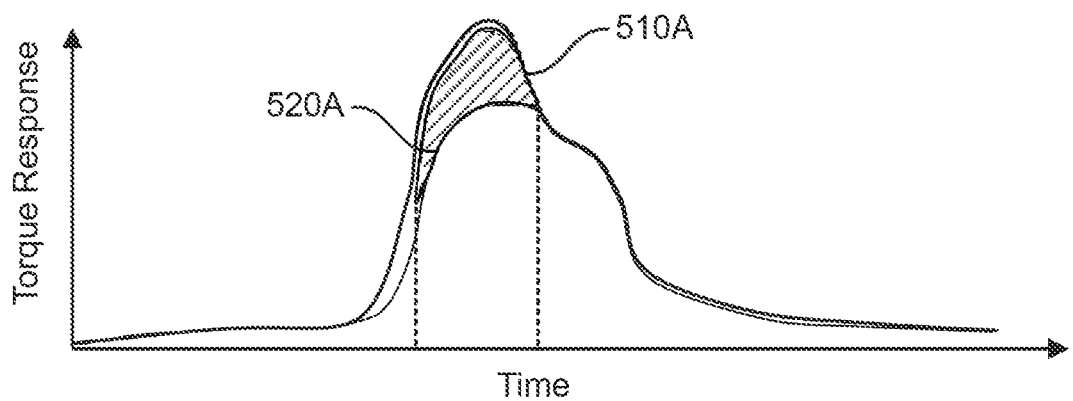
FIG. 5A is an illustrative example of torque responses in different operation modes.
Figure 5B:
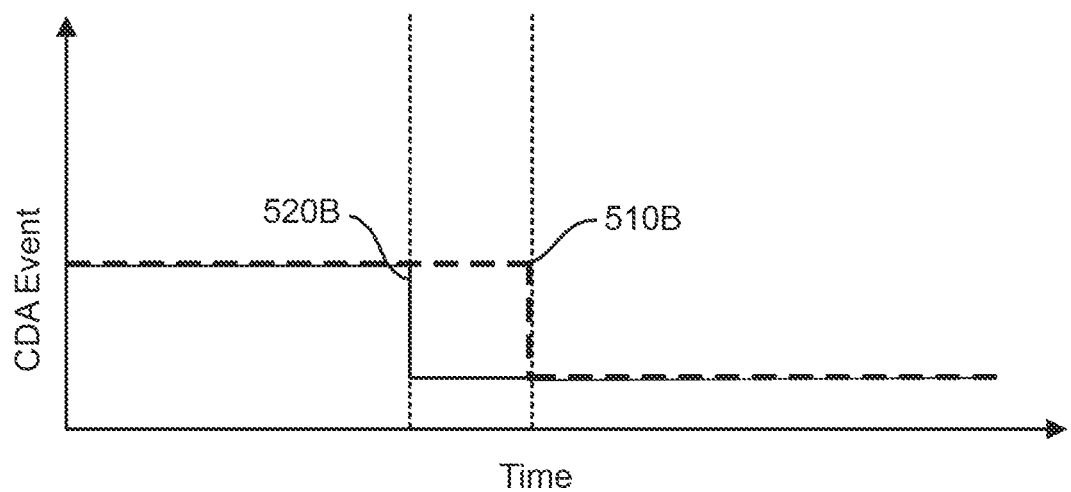
FIG. 5B is an illustrative example of a comparison of the duration of CDA operation.

FIG. 5A is an illustrative example of torque responses in different operation modes; and FIG. 5B is an illustrative example of a comparison of the duration of CDA operation, where a high represents in CDA mode and a low represents not in CDA mode. The torque response of electrified powertrains in CDA with torque assist mode, in accordance with certain embodiments of the present disclosure, is illustrated as waveform 510A and the corresponding CDA curve is illustrated as waveform 510B. The torque response of engines in conventional CDA mode is illustrated as waveform 520A and the corresponding CDA curve is illustrated as waveform 520B. As shown, the CDA with torque assist mode improves the torque response of conventional CDA operation and extends the duration of CDA operation.

Figure 2B:
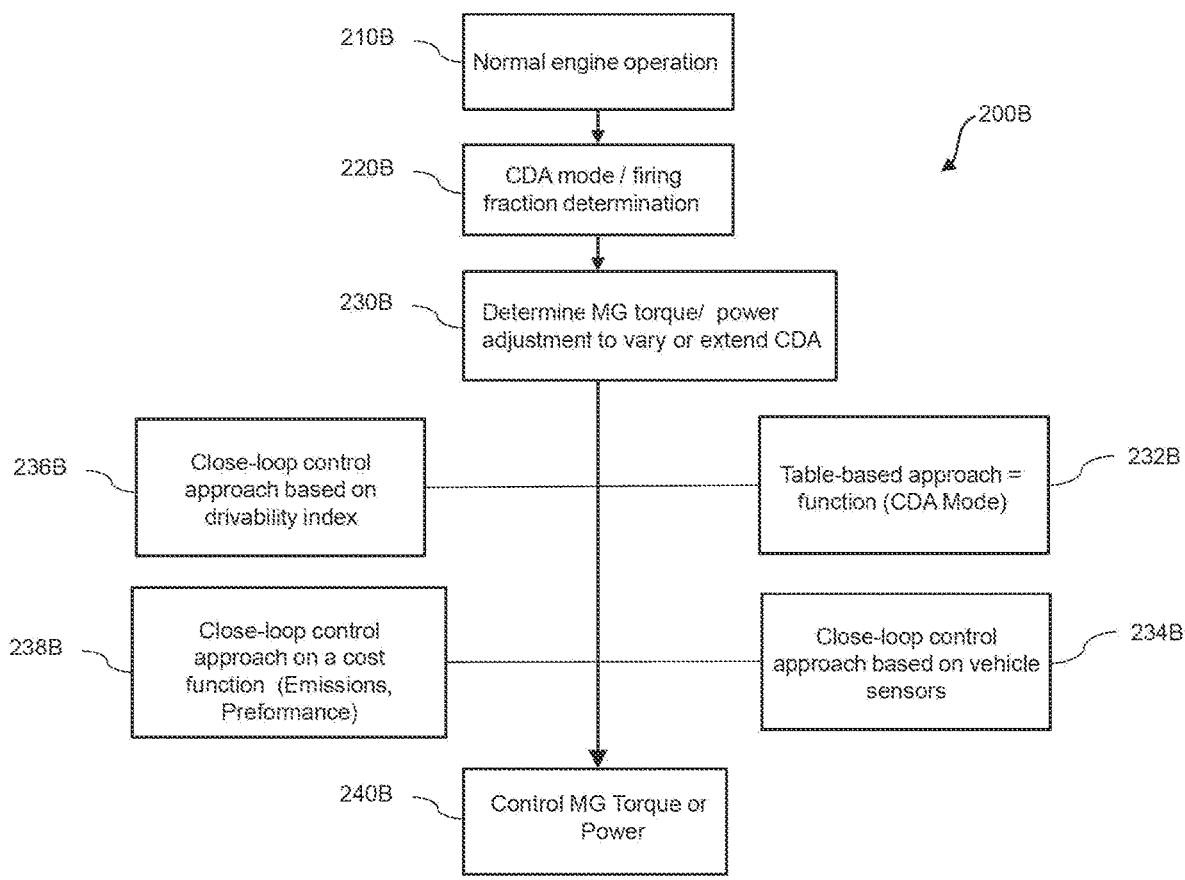
FIG. 2B is another example flow diagram depicting an illustrative method of controlling a CDA operation of an electrified powertrain, in accordance with certain embodiments of the present disclosure.

FIG. 2B is an example flow diagram depicting an illustrative method 200B of controlling a CDA operation of an electrified powertrain, in accordance with embodiments of the present disclosure. Aspects of embodiments of the method 200B may be performed, for example, by a system (e.g., electrified powertrain system 100A in FIG. 1A), a controller (e.g., the controller 140A in FIG. 1A, the electrified powertrain controller 100B in FIG. 1B). One or more steps of method 200B are optional and/or can be modified by one or more steps of other embodiments described herein. Additionally, one or more steps of other embodiments described herein may be added to the method 200B. Initially, the electrified powertrain is in normal engine operation (210B). The powertrain controller can start an CDA mode with firing fraction determination (220B). The powertrain controller may further determine motor/generator torque or other power adjustment to control, vary; or extend the CDA operation (230B). The controller can use one or more of the approaches of 232B, 234B, 236B, and 238B to control, vary, or extend the CDA operation.

In some embodiments, the powertrain controller can use a table-based approach (232B). In one embodiment, the table is a motor/generator torque table such that motor/generator torque(s) and/or torque ranges can be looked up by the CDA modes. In one example, the CDA modes include the aggressive CDA mode, the moderate CDA mode, and the mild CDA mode. In this example, the aggressive CDA mode is a more aggressive CDA mode (e.g., more cylinders deactivated) than the moderate CDA mode and the mild CDA mode; the mild CDA mode is less aggressive CDA mode (e.g., less cylinders deactivated) than the moderate CDA mode and the aggressive CDA mode.

In some embodiments, the powertrain controller can use a close-loop control approach based on vehicle sensor data (234B). In some cases, the vehicle sensor data includes data indicative at least one of noise levels, vibration levels and harshness levels (NVH). In some embodiments, the powertrain controller is configured to extend or vary the CDA operation based at least partially on vehicle sensor data. In one embodiment, the powertrain controller can disable the CDA operation or control the CDA operation to operate in a less aggressive CDA operation if the vehicle sensor data or NVH measurement reaches or above a predetermined threshold.

In some cases, if the vibration measurement, noise measurement, and/or harshness measurement is lower than a predetermined threshold, the controller may extend the CDA operation or control the CDA operation to operate in a more aggressive CDA mode. In some cases, if the vibration measurement, noise measurement, and/or harshness measurement is greater than a predetermined threshold, the controller may disable the CDA operation or control the CDA operation to operate in a less aggressive CDA mode. In some embodiments, the powertrain controller is configured to extend or vary the CDA operation based at least partially on sensor data indicative of at least one of exhaust, gas temperature and catalyst temperature. For example, if the catalyst temperature is above 250° C., the controller may disable CDA operation or control the CDA operation to operate in a less aggressive CDA mode. As another example, if the catalyst temperature is lower than 250° C., the controller may extend the CDA operation or control the CDA operation to operate in a more aggressive CDA mode (e.g., deactivate more cylinders and extend the deactivation).

In some embodiments, the powertrain controller can use a close-loop control approach based on the drivability index (236B). In some cases, the controller is configured to extend or vary the CDA operation based at least partially on the drivability index. The drivability index is determined based at least partially on data collected from vehicle sensor(s). In one embodiment, NVH measurements can be a part of the drivability index. In one embodiment, if the drivability index is higher than a predetermined drivability threshold, the controller may extend the CDA operation and/or control the CDA operation to operate in a more aggressive CDA mode. In some embodiments, if the drivability index is lower than a predetermined drivability threshold, the controller may disable the CDA operation or control the CDA operation to operate in a less aggressive CDA mode.

In some embodiments, the powertrain controller can use a close-loop control approach on cost function (238B), for example, using emission data and/or performance data. In some cases, the controller is configured to extend or vary the CDA operation is determined based at least partially on a function of emission data and/or performance data. In some embodiments, the CDA controller 120B is configured to extend or vary the CDA operation based at least partially on a cost function applied to emission data and/or performance data. In one embodiment, if a cost function of emission data as variable is high (e.g., 1 or close to 1), the powertrain controller may engage CDA operation (e.g., extend the CDA operation, operate in a more aggressive CDA mode) to help reduce emissions. In one embodiment, if a cost function of emission data is lower (e.g., 0.2 or lower than 0.2), the controller may disable the CDA operation or operate in a less aggressive CDA mode.

In some embodiments, the powertrain controller can control the motor/generator torques or other power adjustment (240B), for example, based on the torque/power determination through steps 230B-238B. In some cases, the controller can send a motor/generator torque request when excessive driving torque demand occurs. In one example, the motor/generator torque request can be determined using equation (1).

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

What is claimed is:

1. A method of controlling a cylinder deactivation (CDA) operation for an electrified powertrain, the electrified powertrain comprising an engine and an additional power source, the engine having a plurality of cylinders, the method comprising:
    operating, by a controller comprising one or more processors, the electrified powertrain in a CDA mode and deactivating one or more selected cylinders of the plurality of cylinders;
    receiving, by the controller, measurement data indicative of operating conditions of the electrified powertrain;
    analyzing, by the controller, the measurement data to determine whether a predetermined operating condition is met; and
    in response to the predetermined operating condition not being met,
        adjusting, by the controller, the CDA operation by adjusting the duration of the CDA operation,
        wherein the duration of the CDA operation is adjusted based at least partially on an output of a cost function applied to performance data.

2. The method of claim 1, wherein the predetermined operating condition comprises at least one of a noise, vibration and harshness (NVH) criterion, an emission criterion, a transient performance criterion, and a drivability index criterion.

3. The method of claim 1, wherein the CDA operation is adjusted based at least partially on a look-up table on CDA modes and motor/generator torques.

4. The method of claim 1, wherein the measurement data comprises vehicle sensor data, wherein the CDA operation is adjusted based at least partially on the vehicle sensor data, and wherein the vehicle sensor data comprises data indicative of at least one of noise levels, vibration levels and harshness levels.

5. The method of claim 1, wherein the measurement data comprises vehicle sensor data, wherein the CDA operation is adjusted based at least partially on the vehicle sensor data, and wherein the vehicle sensor data comprises data indicative of at least one of exhaust gas temperatures and catalyst temperatures.

6. The method of claim 1, wherein the CDA operation is adjusted based at least partially on a drivability index.

7. The method of claim 6, wherein the drivability index is determined based at least partially on at least one of noise measurements, vibration measurements and harshness measurements.

8. The method of claim 1, further comprising:
in response to the predetermined operating condition being met,
adjusting, by the controller, the CDA operation such that the CDA operation is deactivated or in a less aggressive CDA mode.

9. The method of claim 1, wherein a mode of the CDA operation is adjusted based at least partially on the output of the cost function applied to performance data.

10. The method of claim 1, wherein the CDA operation is adjusted based at least partially on a transient performance of the electrified powertrain.

11. A system of controlling a cylinder deactivation (CDA) operation for an electrified powertrain, the electrified powertrain comprising an engine and an additional power source, the engine having a plurality of cylinders, the system comprising:
one or more memories having instructions; and
one or more processors configured to execute the instructions to perform operations comprising:
operating the electrified powertrain in a CDA mode and deactivating one or more selected cylinders of the plurality of cylinders;
receiving measurement data indicative of operating conditions of the electrified powertrain;
analyzing the measurement data to determine whether a predetermined operating condition is met; and
in response to the predetermined operating condition not being met,
adjusting the CDA operation by adjusting the duration of the CDA operation,
wherein the duration of the CDA operation is adjusted based at least partially on an output of a cost function applied to performance data.

12. The system of claim 11, wherein the predetermined operating condition comprises at least one of a noise, vibration and harshness (NVH) criterion, an emission criterion, a transient performance criterion, and a drivability index criterion.

13. The system of claim 11, wherein the CDA operation is adjusted based at least partially on a look-up table on CDA modes and motor/generator torques.

14. The system of claim 11, wherein the measurement data comprises vehicle sensor data, wherein the CDA operation is adjusted based at least partially on the vehicle sensor data, and wherein the vehicle sensor data comprises data indicative of at least one of noise levels, vibration levels and harshness levels.

15. The system of claim 11, wherein the measurement data comprises vehicle sensor data, wherein the CDA operation is adjusted based at least partially on the vehicle sensor data, and wherein the vehicle sensor data comprises data indicative of at least one of exhaust gas temperatures and catalyst temperatures.

16. The system of claim 11, wherein the CDA operation is adjusted based at least partially on a drivability index.

17. The system of claim 16, wherein the drivability index is determined based at least partially on at least one of noise measurements, vibration measurements and harshness measurements.

18. The system of claim 11, wherein the operations further comprise:
in response to the predetermined operating condition being met,
adjusting the CDA operation such that the CDA operation is deactivated or in a less aggressive CDA mode.

19. The system of claim 11, wherein a mode of the CDA operation is adjusted based at least partially on the output of the cost function applied to performance data.

20. The system of claim 11, wherein the CDA operation is adjusted based at least partially on a transient performance of the electrified powertrain.

* * * * *